FIG. 1
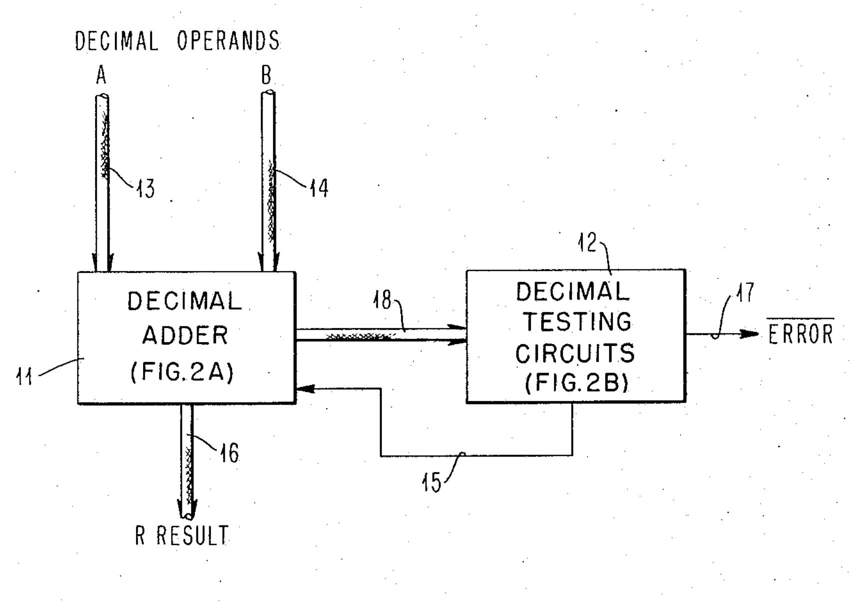
FIG. 2C
| CODE | OPERATION | t | c | b |
|---|---|---|---|---|
| DECIMAL | R = A + B<br>R = A − B | 1<br>0 | 0<br>1 | 0<br>0 |
| BINARY | R = A + B | 0 | 0 | 1 |
FIG. 5
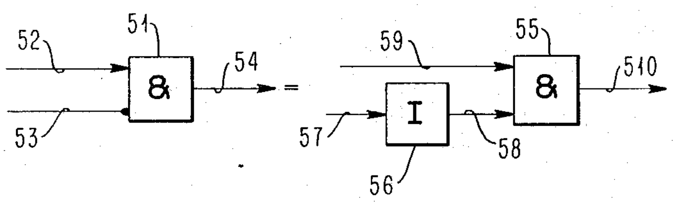
INVENTORS
NIANN-CHYUNG DENG
SYDNEY L. LINDAUER
GERARD T. PAUL
BY Gunter A. Hauptman
ATTORNEY

DECIMAL CORRECTOR 22

PARITY MODIFIER 23

PARITY CORRECTOR 25

FIG. 4B BINARY PARITY PREDICTOR / CHECKER 24
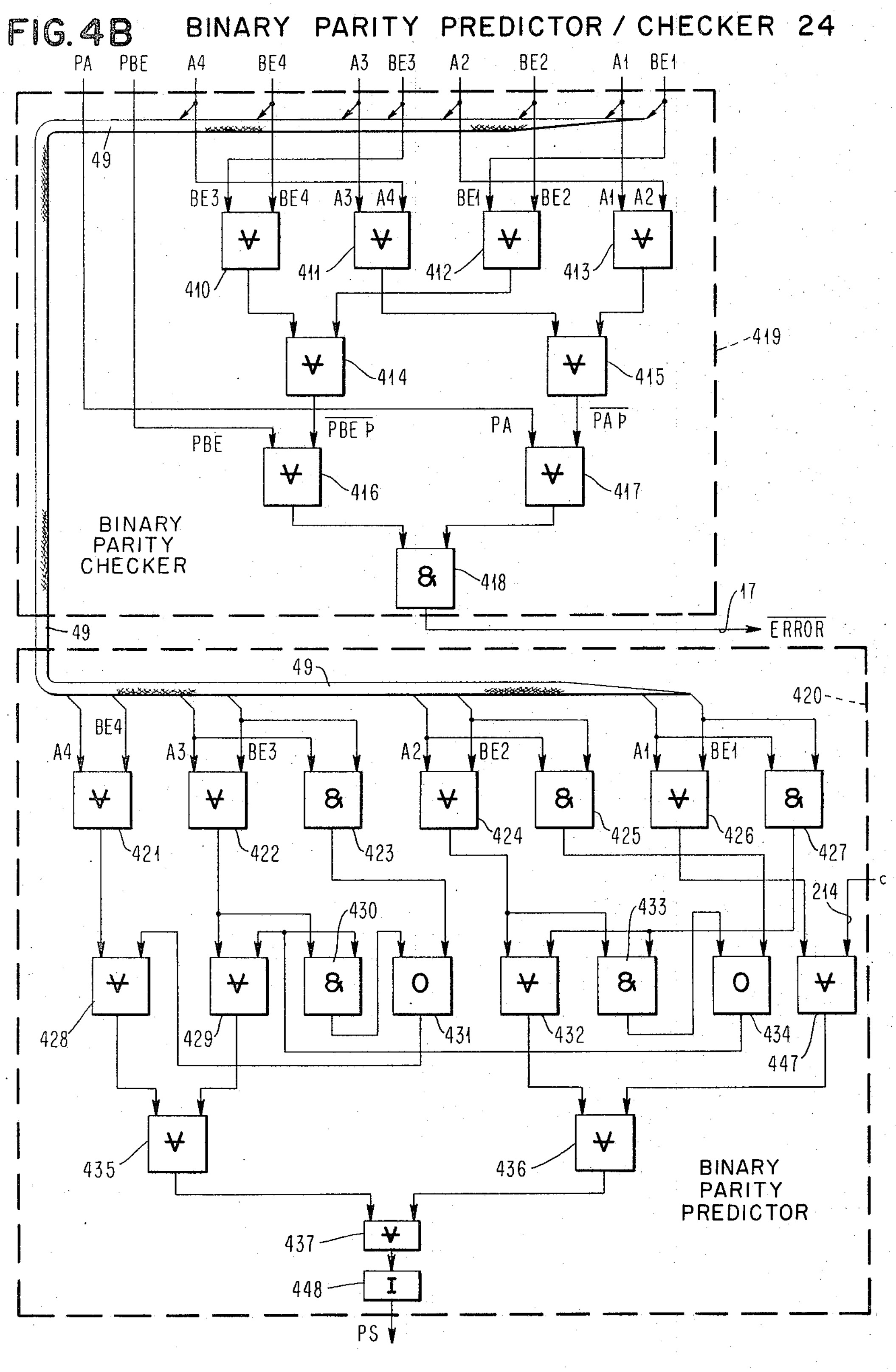

United States Patent Office 3,300,625
Patented Jan. 24, 1967

3,300,625
APPARATUS FOR TESTING BINARY-CODED DECIMAL ARITHMETIC DIGITS BY BINARY PARITY CHECKING CIRCUITS

Niann-Chyung Deng and Sydney L. Lindauer, Wappingers Falls, and Gerard T. Paul, Poughkeepsie, N.Y., assignors to International Business Machines Corporation, New York, N.Y., a corporation of New York Filed Dec. 4, 1963, Ser. No. 327,915
16 Claims. (Cl. 235—153)

This invention relates to electronic apparatus. More particularly, this invention relates to apparatus for testing electronic digital arithmetic circuits.

Though humans do arithmetic best in the decimal numeric system, machines are more efficient in the binary numeric system. Since decimal machines while easy to use are slow, humans occasionally learn the binary system to simplify communication with binary machines. A translator between the human and a binary machine permitting each to operate in its most efficient manner is a common compromise. Humans communicate with binary machines in decimal language through translation circuits which modify the human decimal language for the binary machine and modify the binary machine language for the human.

In the well-known binary numeric system, binary integers (either 1-bits or 0-bits) define numeric quantities. For example, a ten-position binary data word defines 1024 permutations; that is, any decimal number from zero through 1023. The binary numeric system expresses decimal numbers from zero through nine by grouping four bits to represent each decimal number, any binary value higher than nine (four binary bits can express any decimal number from zero through 15) being invalid. Each four-bit decimal-representative binary group is called a binary-coded decimal character.

Performing binary-coded decimal arithmetic operations, such as decimal addition or subtraction, with binary circuits permits humans to communicate with binary machines in decimal language. One well-known technique converts binary-coded decimal characters to a form usable by a binary adder by adding a filler digit value (typically six) to one of two binary-coded decimal operands prior to binary addition of the modified operand and the unmodified operand. If there is a 1-bit carry from the binary adder's highest order, the binary sum is the correct binary-coded decimal sum of the two original binary-coded decimal characters. However, if there is a 0-bit carry, a correction circuit subtracts the filler digit value from the binary sum to form the correct binary-coded decimal sum.

Since binary testing equipment tests binary arithmetic circuits best, translation techniques complicate decimal operand and result testing. One well-known binary testing technique associates each binary word with an additional parity (or redundancy) bit which maintains the sum of 1-bits in its associated word odd (or even). Thus, errors are easily detected by testing the oddness (or evenness) of the binary word 1-bits. Though binary-coded decimal characters are also assigned parity bits for testing purposes, binary parity circuits associated with binary adders do not correctly check binary-coded decimal characters.

Therefore, an object of this invention is to provide improved arithmetic testing apparatus.

Another object is to provide apparatus for improved testing of binary arithmetic apparatus by utilizing parity bits.

An additional object of this invention is improved testing of binary-coded decimal arithmetic digits by binary parity checking circuits.

A further object is to provide apparatus for testing binary-coded decimal arithmetic digits with binary parity prediction circuits.

Still another object of this invention is to provide a combination of circuits for testing binary-coded decimal arithmetic digits by checking input parities and predicting output parities with binary circuits.

The foregoing and other objects, features and advantages of the invention will be apparent from the following more particular description of the preferred embodiment of the invention, as illustrated in the accompanying drawings.

These objects are achieved, for example, in a combination decimal adder and tester which, though primarily constructed of binary circuits, communicates externally in binary-coded decimal language. Binary arithmetic circuits form binary-coded decimal results from binary-coded decimal operands, while binary testing circuits check the parities of incoming binary-coded decimal characters and predict parities for outgoing binary-coded decimal results.

In the illustrated embodiment, each adder input operand character comprises a binary-coded decimal numeric portion, an additional parity bit maintaining an odd number of 1-bits. Binary-coded decimal result characters have the same format.

The illustrative decimal adder, using well-known techniques, combines a binary adder with filler digit modification and correction circuits. The modification circuit adds the filler digit to the numeric portion of one input operand prior to binary addition of the modified operand to the unmodified operand. After binary addition, the correction circuit forms the decimal result by subtracting the filler digit from the binary result, if there is no carry from the highest order bit position of the binary adder.

The tester combines a well-known binary parity checker and predictor with novel parity modification and correction circuits. The tester operates, simultaneously with the adder, upon operand parity bits and additional information from the adder, to check the accuracy of the binary-coded decimal characters supplied to the adder and to predict a parity bit for the binary-coded decimal output from the decimal adder. The novel modifying circuit modifies the parity bit of the operand modified by the filler digit in the adder to correctly represent the parity of the modified operand. A standard binary parity checker uses the modified operand and the modified parity bit, together with the unmodified operand and its parity bit, to indicate an error if the operands were incorrectly supplied or if the modifier in the adder operated incorrectly. A standard binary parity predictor uses the same information as the checker to predict a parity bit corresponding to the binary adder output sum. Since this predicted parity does not correspond to the final decimal result, it is corrected by the novel parity correction circuits to represent the parity of the binary-coded decimal result.

The decimal testing circuits described may operate with a decimal adder that adds (or subtracts) either binary coded decimals or, if desired, binary numbers.

In the figures:

FIGURE 1 is a block diagram illustrating a combination using the invention.

FIGURES 2A and 2B form a block diagram showing the combination of FIGURE 1 in more detail.

FIGURE 4B is a logic diagram of one possible embodiment of an binary parity predictor and a binary parity checker which may be used in the invention.

FIGURE 5 is a logic diagram illustrating the operation of a component used in the invention.

I. GENERAL DESCRIPTION

*Structure (FIGURES 1 and 2)*

Figures 2A, 2B:
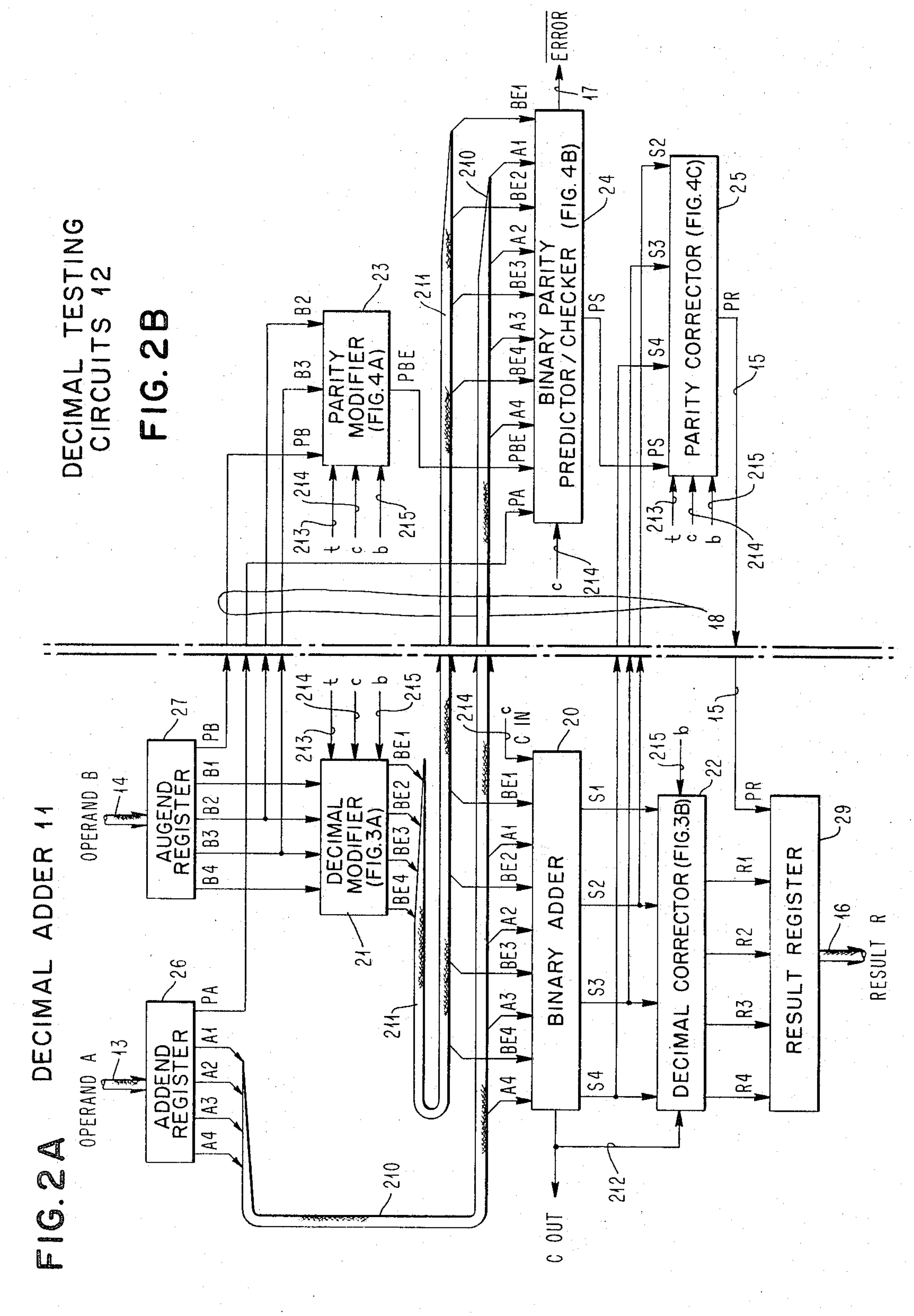
FIGURE 2C is a table illustrating operations performable by the combination shown in FIGURES 2A and 2B.

Referring to FIGURE 1, a decimal adder 11 and decimal testing circuits 12 using the invention are shown. Four bit binary-coded decimal numeric operands, having weights 8, 4, 2 and 1 respectively, communicate with the circuits. For example, the character 0010 has the decimal value two. Since four bit binary-coded decimal characters represent decimal digits, each must have a value between (and including) zero and nine, any value higher than nine being invalid.

Cables 13 and 14 supply binary-coded decimal operands to the decimal adder 11. Operand A may be an addend and operand B may be an augend (or the reverse) and, since the adder performs subtraction also, these operands could instead be subtrahend and minuend. The decimal adder 11 supplies a binary-coded decimal result character on cable 16 which is, during addition, the sum of the operands A and B while, during subtraction, it is the difference between A and B.

Decimal testing circuits 12 use information from the decimal adder 11 on cable 18 to check the accuracy of decimal adder 11 operations. The decimal testing circuits 12 indicate on line 17 if the decimal adder has received input operands correctly $(\overline{\text{error}})$ and supply on line 15 a signal (parity bit) used, in conjunction with the results supplied by the decimal adder 11, for future checking purposes.

FIGURE 2A shows the decimal adder 11 in greater detail and FIGURE 2B shows the decimal testing circuits 12 in greater detail.

*Decimal adder.*—Referring first to FIGURE 2A, the decimal adder 11 comprises a binary adder 20 in conjunction with a decimal modifier 21 and a decimal corrector 22, permitting the binary adder 20 to operate on binary-coded decimal characters. Binary-coded decimal characters are supplied on cable 13 to an addend register 26 and on cable 14 to an augend register 27, while results are supplied to cable 16 through a result register 29. The registers 26, 27 and 29, which are not essential to the operation of the invention, are shown for purposes of illustration only as part of the decimal adder 11. The binary-coded decimal character supplied to addend register 26 is connected by a cable 210 to binary adder 20 inputs directly whereas the character supplied to the augend register 27 is connected to binary adder 20 inputs by cable 211 via the decimal modifier 21. The output of the binary adder 20 passes through the decimal corrector 22 to form a result in the result register 29.

The addend register 26 and the augend register 27 each have five positions for storing one four bit binary-coded decimal numeric character and one associated parity bit. Since the positions of the registers 26 and 27 are labeled in accordance with the operand and the bit positions, operand A is stored in addend register 26 positions A4, A3, A2, A1 and PA, and operand B is stored in register 27 positions B4, B3, B2, B1 and PB.

The decimal modifier 21 (explained in more detail below with reference to FIGURE 3A), connected to the numeric positions B4, B3, B2 and B1 of the augend register 27, adds a filler digit to operand B prior to its use by the binary adder 20 during addition of binary-coded decimal digits. During subtraction, the decimal modifier circuit 21 inverts the contents of the augend register 27 prior to transferring them via cable 211 to the binary adder 20. If desired, the decimal modifier 21 can simply pass the contents of the augend register 27 to the binary adder 20 without change if there are binary operands on cable 13 and 14. The particular operation performed by the decimal modifier 21 is chosen by placing a signal on selected ones of control lines 213, 214 and 215.

The operations true decimal addition ($t$), complement decimal subtraction ($c$) and binary addition ($b$), performed in accordance with signals $t$, $c$ and $b$ on control lines 213, 214 and 215, are summarized in the table of FIGURE 2C. Normally a 1-bit signal is placed on the true ($t$) line 213, the decimal modifier 21 then adding six to every binary-coded decimal character in the augend register 27 prior to its use by the binary adder 20. With a 1-bit signal on the complement ($c$) line 214, the decimal modifier 21 inverts (in 1's complement form, later adjusted to 2's complement form by the adder 20) the augend register 27 contents prior to use by the binary adder 20. The decimal modifier 21 has no effect on the augend register 27 contents when a signal is applied on the binary ($b$) line 215.

The binary adder 20, a well-known device having any desired construction such as ripple carry, carry propagate, carry lookahead, carry save, carry eliminate, etc. forms a binary sum (S) and high order output carry ($C_{out}$) as a function of two operands (A and B) and an input carry ($C_{in}$). One example of a ripple carry adder is provided by the binary parity predictor 420 shown in detail in FIGURE 4B and described below. In the particular example used, here, the binary adder 20 receives two 4-bit numerals A4A3A2A1 and BE4BE3BE2BE1, and an input carry $C_{in}$ from the complement line 214. The resultant 4-bit sum S4S3S2S1 and high order carry $C_{out}$ follows the well-known rules of binary addition. The binary adder 20 subtracts only insofar as one of the operands is supplied in complement form, though it would be obvious to provide a subtracter in its place if desired. Subtraction of a complemented (1's complement form) operand from an uncomplemented (true form) operand entails simple binary addition of the two operands, an input carry ($C_{in}$) adjusting the complemented operand to the more convenient 2's complement form. While any number of binary adder 20 bit positions may be provided, only four positions are required if one decimal character at a time is supplied to the decimal adder 11. Obviously, by providing more bit positions, several simultaneous decimal characters may be supplied to the decimal adder 11.

The decimal corrector 22 (explained in more detail below with reference to FIGURE 3B) receives the binary adder 20 sum outputs S4, S3, S2 and S1, and its carry out $C_{out}$ on line 212, subtracting six (0110) from the binary adder 20 output S4S3S2S1 if there is a 0-bit on $C_{out}$ line 212; otherwise it simply passes the sum without change. The decimal corrector 22 similarly passes the sum without change if a signal on line 215 indicates that the decimal adder 11 is being used as a binary device.

The result register 29 receives the final result from the decimal corrector 22, in addition to a corresponding parity bit PR from line 15, to form a binary-coded decimal character and parity bit.

*Decimal testing circuits.*—Referring now to FIGURE 2B, the decimal testing circuits 12 will be described. A binary parity predictor/checker 24, of well-known design, a novel parity modifier 23 and a novel parity corrector 25 check the accuracy of decimal adder 11 inputs and modifications and predict a parity bit PR for use with the decimal adder 11 result R4R3R2R1. The conditions available to the binary adder 20 are synthesized for the parity predictor/checker 24 by the parity modifier 23. Since the binary parity predictor/checker 24 thus operates upon the same information that is supplied to the binary adder 20, it supplies a predicted parity PS corresponding to the output S4S3S2S1 of the binary adder 20 rather than to the binary coded decimal output R4R3R2R1 available from the decimal adder 11. Therefore, the parity output PS of the binary parity/checker is corrected by the parity corrector 25 to form a parity bit (PR) corresponding to the decimal output of the decimal adder 11.

The parity modifier 23 (explained in more detail below with reference to FIGURE 4A) monitors two bit positions B3 and B2 of operand B for modifying the corresponding parity bit PB, in accordance with changes made in the operand B by the decimal modifier 21, to form a modified parity PBE corresponding to the modified output BE4BE3BE2BE1 of the decimal modifier 21. Parity modifier 23 receives control signals on lines 213, 214 and 215 so that whatever operations are performed by decimal modifier 21, compensating operations will be performed upon the parity bit PB by the parity modifier 23. Parity modifier 23 is shown connected for operation with operand B as an illustration only; it could also be used with operand A.

Binary parity predictor/checker 24 (explained in more detail below with reference to FIGURE 4B provides a signal ($\overline{\text{error}}$) on line 17 if the parity bits PA and PBE correctly correspond to their associated characters A4A3A2A1 and BE4BE3BE2BE1 respectively. An error may be due either to initially incorrect operands on cables 13 and 14 or errors introduced by the decimal modifier 21. The binary parity predictor/checker 24 also generates a parity bit PS, corresponding to the output S4S3S2S1 of the binary adder 20, as a function of the signals on cables 210 and 211. Since the parity bit PS is affected by the presence or absence of an input carry $C_{in}$ to binary adder 20, it senses the common controlling complement signal *c* on line 214.

Parity corrector 25 (explained in more detail below with reference to FIGURE 4C) monitors binary adder 20 binary sum outputs S4, S3 and S2 to determine whether or not the parity bit PS should be changed to a parity bit PR, corresponding to the decimal sum R4R3R2R1, as a result of operations in the decimal corrector 22. Compensation for actions of the decimal corrector 22 depends upon the operations indicated by control lines 213, 214 and 215 supplied to the parity corrector 25. The output parity bit PR from the parity corrector 25 is supplied on line 15 to the result register 29.

Result register 29 receives and holds, for subsequent utilization by cable 16, the decimal result R4R3R2R1 from decimal corrector 22 and the corresponding parity bit PR from parity corrector 25.

*Operation (FIGS. 1 and 2)*

The operation of the circuit shown in FIGURES 2A and 2B will be described for the addition and subtraction of two operands. During addition the true *t* control line 213 will be the only one with a 1-bit, while during subtraction only the complement *c* control line 214 will carry a 1-bit. Operand A will for the example be assigned decimal value five which is written, for the addend register 26 bit positions A4A3A2A1PA, as 01011. Operand B will be assigned decimal value four which is written, for augend register 27 bit positions B4B3B2B1PB, as 01000. The operations of decimal adder 11 will be described first, though the decimal testing circuits 12 operate simultaneously.

*Addition.*—The numeric part 0101 of addend register 26 contents 01011 are transferred via cable 210 to the corresponding inputs of binary adder 20. The numeric part 0100 of augend register 27 contents 01000 is transferred to the inputs of decimal modifier 21. Since there is a 1-bit signal on true *t* line 213 to the decimal modifier 21, six (0110) is added to the numeric value 0100 forming a decimal modifier 21 output BE4BE3BE2BE1 on cable 211 having the value 1010.

Binary adder 20 receives a character A4A3A2A1 having a value 0101 on cable 210, a character

BE4BE3BE2BE1 having a value 1010 on cable 211 and an input carry $C_{in}$ having a value of 0 on line 214. The binary sum of the inputs is a sum S4S3S2S1 having the value 1111 and an output carry $C_{out}$ on line 212 having the value of 0.

The decimal corrector 22 receives the binary adder 20 character S4S3S2S1 having the value 1111 and receives on line 212 a 0-bit. Since $C_{out}$ is a 0-bit, the decimal corrector 22 subtracts six (0110) from the character 1111 to form, in the result register 16, a result R4R3R2R1 having the value 1001 (nine).

The decimal testing circuits 12, operative during the above operations, react to the parity bits PA and PB in addend register 26 and augend register 27 respectively to form a parity bit PR available to the result register 29 at the same time as the character R4R3R2R1.

The parity modifier 23 recognizes that the values of bit positions B3 and B2 in augend register 27 are 1 and 0 respectively causing, as a result, the parity bit PB to be changed from a 0 to a 1 (PBE). Parity modifier 23 thus supplies a parity bit PBE value 1 corresponding to the modified operand BE4BE3BE2BE1 value 1010. This action is dependent upon the fact that there is a 1-bit on line 213 indicating addition.

Binary parity predictor/checker 24 receives the entire contents A4A3A2A1PA, having the value 01011, of addend register 26 and the contents BE4BE3BE2BE1PBE, having the value 10101, of augend register 27 as modified by the decimal modifier 21 and parity modifier 23. A 1-bit signal appears on $\overline{\text{error}}$ line 17 indicating that the parity bits PA and PBE properly correspond with their associated characters. Also, binary parity predictor/checker 24 supplies as a function of its inputs a parity bit PS, having the value 1, corresponding to the binary adder output S4S3S2S1 value 1111.

Parity corrector 25 by monitoring binary adder 20 outputs S4, S3 and S2 (which are 1, 1 and 1 respectively) determines that the 1-bit value of parity bit PS need not be changed to form a result parity bit PR for use with the result R4R3R2R1 value 1001.

Thus, parity corrector 25 output PR value 1 is supplied on line 15 to result register 29 to form a final binary coded decimal result character and parity bit R4R3R2R1PR having the value 10011.

*Subtraction.*—In the case of subtraction, the above operations are similar but the results are different since the signal previously present on true *t* line 213 is now on complement *c* line 214 causing the decimal modifier 21 to invert each bit supplied to it.

Starting with the decimal adder 11, the addend register 26 operand A4A3A2A1 numeric part 0101 is supplied directly to the binary adder 20, while the augend register 27 operand B4B3B2B1 numeric part 0100 is supplied to the decimal modifier 21 which inverts it to 1011. The binary adder 20 receives two characters A4A3A2A1 (0101) and BE4BE3BE2BE1 (1011) and a 1-bit input carry $C_{in}$ on line 214. Binary adder 20 therefore has an output S4S3S2S1 (0001) and 1-bit output carry $C_{out}$ on line 212. Decimal corrector 22, receiving a 1-bit on line 212, merely passes the binary adder 20 output S4S3S2S1 (0001) to the result register 29 positions R4R3R2R1 without change.

The simultaneously operating testing circuits 12 generate a parity bit PR corresponding to the result stored in the result register 29.

Parity modifier 23, which monitors bit positions B3 and B2 (1 and 0 respectively) causes the parity bit PB value 0 to be passed without change as parity bit PBE value 0 to the binary parity predictor/checker 24. Binary parity predictor/checker 24 checks A4A3A2A1PA (01011) and BE4BE3BE2BE1 (10110), indicating on line 17, by a 1-bit, that there is no error. The same inputs, plus the 1-bit on line 214, generate a parity bit PS value 0 corresponding to the binary adder 20 sum S4S3S2S1 value 0001. Parity corrector 25 utilizes the parity bit PS value 0 and the binary adder 20 sum values S4, S3 and S2 (which are 0, 0 and 0 respectively) to generate the parity bit PR value 0 corresponding to the result 0001 in the result register 29.

II. DETAILED STRUCTURE

*Components*

Through the component logic circuits shown in FIGURES 3A, 3B, 4A, 4B, 4C and 5 are well known, the conventions used will be briefly explained for convenience.

OR circuits, indicated by the letter O, have a 1-bit output signal if any one of the input lines to a circuit has a 1-bit present on it. Invert circuits, indicated by the letter I, have a 1-bit output if a 0-bit is applied to the input; the output is a 0-bit if a 1-bit is applied to the input. Exclusive OR circuits, indicated by the symbol ⊻, have a 1-bit signal at the output only when the two inputs are different; an Exclusive OR circuit will have a 0-bit output signal if both inputs are 0-bits or both inputs are 1-bits. AND circuits, shown by the symbol &, have a 1-bit output signal only when all inputs are 1-bits.

Referring to FIGURE 5, some AND circuits have inhibit inputs, shown by a semi-circle in place of the usual arrow. Such AND circuits have a 1-bit output signal only when 1-bits are present on all input lines with arrowheads and zero bits on all semi-circular inhibit inputs. For example, AND circuit 51 will have a 1-bit signal on output line 54 only if there is a 1-bit signal on input line 52 and a 0-bit on input line 53. As is also shown in FIGURE 5, the inhibit input is the equivalent of an invert circuit inserted in an input line. Therefore, the AND circuit 51 can be redrawn as AND circuit 55 if an invert circuit 56 replaces input 53 of AND circuit 51. Invert circuit 56 supplies a 1-bit to input 58 of AND circuit 55 if there is a 0-bit on line 57. Therefore, exactly as for AND circuit 51, there will be a 1-bit signal on line 510 only if there is a 1-bit on line 59 and a 0-bit on line 57.

*Decimal modifier (FIG. 3A)*

Figure 3A:
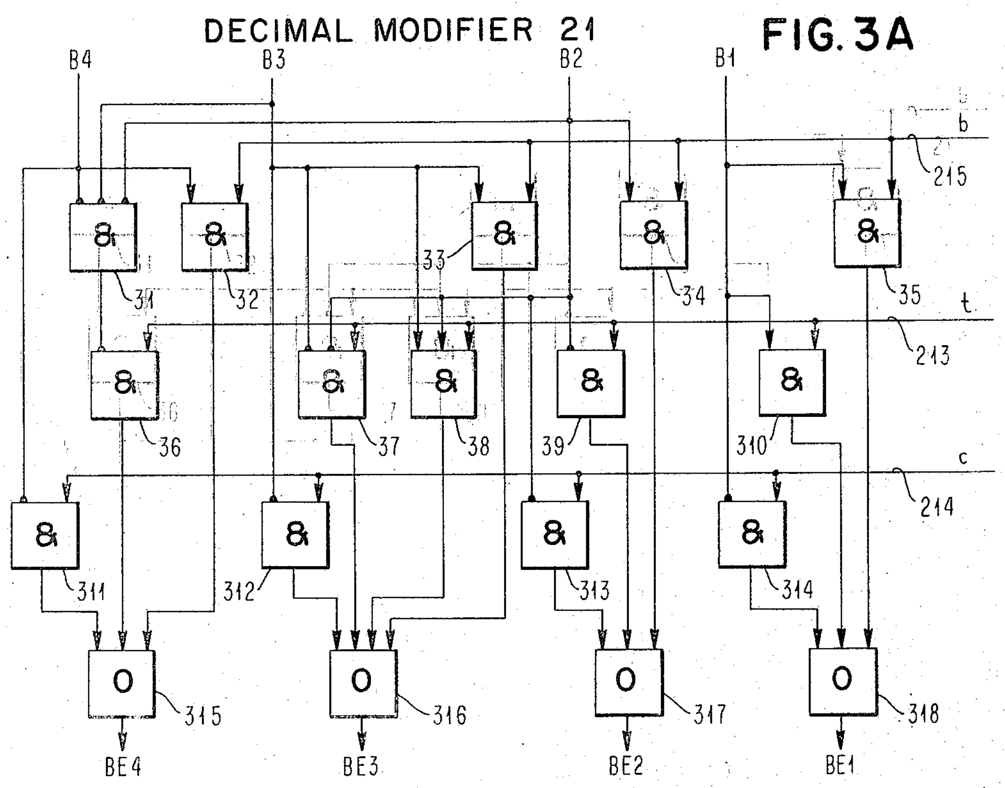
FIGURE 3A is a logic diagram illustrating one possible embodiment of a decimal modifier used in the invention.

FIGURE 3A is a logic block diagram of the decimal modifier 21. Since the function of the decimal modifier 21 is to add a filler digit to one of the operands, in this case operand B, any of a large number of well-known circuits may be substituted. The particular circuit for the decimal modifier 21 shown here permits the decimal adder 11 to add or subtract binary-coded decimal characters or to operate upon pure binary numbers. A signal on true *t* line 213 causes the decimal modifier 21 to add six (0110) to the input number B4B3B2B1, forming an output BE4BE3BE2BE1. A 1-bit on complement *c* line 214 causes the decimal modifier 21 to invert (1's complement) the bits of input B4B3B2B1 in forming the output BE4BE3BE2BE1. Simple inversion suffices because the 9's complement of a number plus six equals the 1's complement of the number. If there is instead a 1-bit on the binary *b* line 215 the input number B4B3B2B1 is passed to outputs BE4BE3BE2BE1 without change.

AND circuits 32, 33, 34 and 35 are operated, when there is a 1-bit signal on *b* line 215, to pass the input number on lines B4, B3, B2 and B1 through OR circuits 315, 316, 317 and 318 directly to output lines BE4, BE3, BE2 and BE1.

If there is instead a 1-bit signal on *t* line 213, AND circuits 36, 37, 38, 39 and 310 transfer inputs B4, B3, B2 and B1 to OR circuits 315, 316, 317 and 318 in a manner which adds six (0110) to the signals present on lines B4, B3, B2 and B1.

If on the other hand, there is a 1-bit on *c* line 214, AND circuits 311, 312, 313 and 314 invert the signals present on input lines B4, B3, B2 and B1 and pass them through OR circuits 315, 316, 317 and 318 to outputs BE4, BE3, BE2 and BE1.

*Decimal corrector (FIG. 3B)*

The decimal corrector 22 subtracts six (0110) from the binary adder 20 outputs S4, S3, S2 and S1 when the adder carry output $C_{out}$ on line 212 is a 0-bit. If the carry output is a 1-bit, the decimal corrector 22 passes the signals on inputs S4, S3, S2 and S1 to outputs R4, R3, R2 and R1 without change. If the decimal adder 11 is being used for binary operations, as evidenced by a 1-bit on *b* line 215, the signals on lines S4, S3, S2 and S1 are also passed to respective ones of output lines R4, R3, R2 and R1 without change.

The AND circuits 321 through 324 and the OR circuits 331, 332 and 333 are arranged to subtract six (0110) from whatever signals are present at the input S4, S3, S2 and S1. Assuming that the output carry $C_{out}$ signal on line 212 is a 0-bit, AND circuits 321, 322, 323 and 324 are all activated to sample signals on input lines S4, S3 and S2 to OR circuits 331, 332 and 333 to corresponding ones of outputs R4, R3 and R2. Input S1 is connected directly to output R1, since the input bit position S1 is not affected by the subtraction of six.

Assuming that the output carry $C_{out}$ from the binary adder 20 on line 212 is a 1-bit, AND circuits 325, 326 and 327 pass the signals on lines S4, S3 and S2 to the OR circuits 331, 332 and 333. Thus signals on lines R4, R3, R2 and R1 equal the signals originally applied on lines S4, S3, S2 and S1, the signal on S1 being passed directly to the output R1.

The above functions depend upon a 0-bit on *b* line 215 (indicating a non-binary operation) to enable AND circuits 321 through 324. In the event that there is a 1-bit on *b* line 215, indicating that binary operations are to be performed, AND circuits 321 through 324 are disabled and AND circuits 328, 329 and 330 pass the signals on lines S4, S3 and S2 through OR circuits 331, 332 and 333. Output signals on lines R4, R3, R2 and R1 equal the original input signals on lines S4, S3, S2 and S1, the signal on line S1 being passed without change to output R1.

*Parity modifier (FIG. 4A)*

The parity modifier 23 takes the input parity bit PB, supplied with the operand B, and modifies it to form parity bit PBE as a function of the operand B bits B3 and B2 and of the decimal modifier 21 operations indicated on control lines 213, 214 and 215. For example, when there is a signal on binary *b* line 215 indicating that the decimal modifier 21 is not being used to change the operand B, the parity bit PBE is the same as the parity bit PB originally supplied.

During binary-coded decimal addition, indicated by a signal on true *t* line 213, AND circuits 45 and 46 sense the operand parity bit PB directly, and indirectly through invert circuit 41, and sense operand bits B3 and B2 through AND circuit 42. The outputs of AND circuits 45 and 46 pass through OR circuit 47 to form the modified parity bit PBE.

If a signal on complement *c* line 214 binary-coded decimal subtraction indicates, AND circuit 44 passes the parity bit PB through the OR circuit 47 to form a parity bit PBE equal to the original parity bit PB. There is no change between PB and PBE during subtraction because inversion of all bits of a 4-bit character does not change its parity.

If a binary operation is indicated by a binary *b* signal on line 215, AND circuit 43 is activated to pass the parity bit PB through OR circuit 47 as a parity bit PBE equal to the original parity bit PB.

*Binary parity predictor/checker (FIG. 4B)*

*Binary parity checker.*—Referring to FIGURE 4B, binary parity checker 419 examines both the original operand A4A3A2A1 and its associated parity bit PA and the modified operand BE4BE3BE2BE1 and its associated modified parity bit PBE to determine whether the relationship among the operand bits and the parity bits is correct or in error. The operation of the binary parity checker 419 is the same regardless of the type of operation being performed in the decimal adder 11. The theory implemented by the circuit shown in FIGURE 4B is that the Exclusive OR of the bits of an operand will give (in the odd parity case) an inverted parity bit value the opposite of the associated parity bit. Therefore an error in an operand (for example B) can easily be detected by monitoring the Exclusive OR of the operand inverted (predicted parity ($\overline{PBEp}$) and its parity bit PBE for a 1-bit. Since there are several variations of this well known theory and many ways of implementing each variation, the particular binary parity checker 419 shown in FIGURE 4B is merely illustrative of one way of achieving the desired results.

Exclusive OR circuits 411 and 413, monitoring operand bits A4, A3, A2 and A1, are connected to Exclusive OR circuit 415 which generates at its output an inverted predicted parity bit $\overline{PAp}$. This predicted parity bit $\overline{PAp}$ is compared with the original parity bit PA, supplied with the operand A, by Exclusive OR circuit 417. Since, if there is no error, PA is the opposite of $\overline{PAp}$, Exclusive OR circuit 417 will apply a 1-bit output to AND circuit 418. Assuming no other error on line 17 indicates that there is no error ($\overline{error}$).

The modified original operand B, now represented by signals on lines BE4, BE3, BE2, BE1 and PBE is treated in the same way as operand A. Exclusive OR circuits 410, 412 and 414 take the Exclusive OR of the operand bits BE1, BE2, BE3 and BE4 to form inverted predicted parity bit $\overline{PBEp}$. Exclusive OR circuit 416 then Exclusive OR's the $\overline{PBEp}$ with the modified parity bit PBE supplied by the parity modifier 23. The output of Exclusive OR circuit 416, which should correctly be a 1-bit, is supplied through AND circuit 418 to line 17 to indicate assuming no error in operand A, that there is no error ($\overline{error}$).

*Binary parity predictor.*—Still referring to FIGURE 4B, a binary parity predictor 420 is illustrated. The purpose of the binary parity predictor 420 is to predict a parity bit PS for use with the binary sum S4S3S2S1 of operands A4A3A2A1 and BE4BE3BE2BE1 and input carry $C_{in}$. There are many ways of predicting a parity for a binary sum of two operands and a carry, the one illustrated here being essentially an imitation of the binary addition procedure (the binary sum being the inputs to Exclusive OR circuits 435 and 436).

During binary-coded decimal addition and pure binary operations in the binary adder 20, the binary adder 20 does not receive an input carry $C_{in}$, however when a 1's complement binary-coded decimal operand is supplied to the binary adder 20, an input carry is supplied from the complement *c* input line 214 to adjust the operand to 2's complement form.

A single full adder, comprising two half adders, is provided for each position of the operands A and B to form a binary sum and carry as a function of the operand bits for that position and the carry from the previous position. Each positional pair of corresponding operand bits on cable 49 is supplied to a first half adder, comprising an Exclusive OR circuit and an AND circuit, in its position. The output (half sum) of the Exclusive OR circuit is then supplied to the input of a second half adder in the same position, which second half adder also receives an input (carry) from a previous position. The outputs of the AND circuits of the two half adders in each position are combined in an OR circuit to form a carry to the next position. It is not necessary to provide AND circuits or OR circuits for either of the half adders in the last position or for the second half adder in the first position. The two sets of half adders for each position generate binary sums which are Exclusive OR'd to predict a corresponding inverted parity bit.

Circuits 421, 422, 423, 424, 425, 426, and 427 form a first set of half adders operating upon the two input operands A4A3A2A1 and BE4BE3BE2BE1. Circuits 428, 429, 430, 431, 432, 433, 434 and 447 form a second set of half adders, and carry combining circuits, which operate upon the outputs of the first half adders and the signal on the *c* line 214 to form binary sum signals. The binary sum signals are sent to Exclusive OR circuits 435 and 436 and then to Exclusive OR circuit 437 and Invert circuit 438 to form a parity bit PS corresponding to the binary sum S4S3S2S1 supplied by the binary adder 20.

*Parity corrector (FIG. 4C)*

Figure 4A:
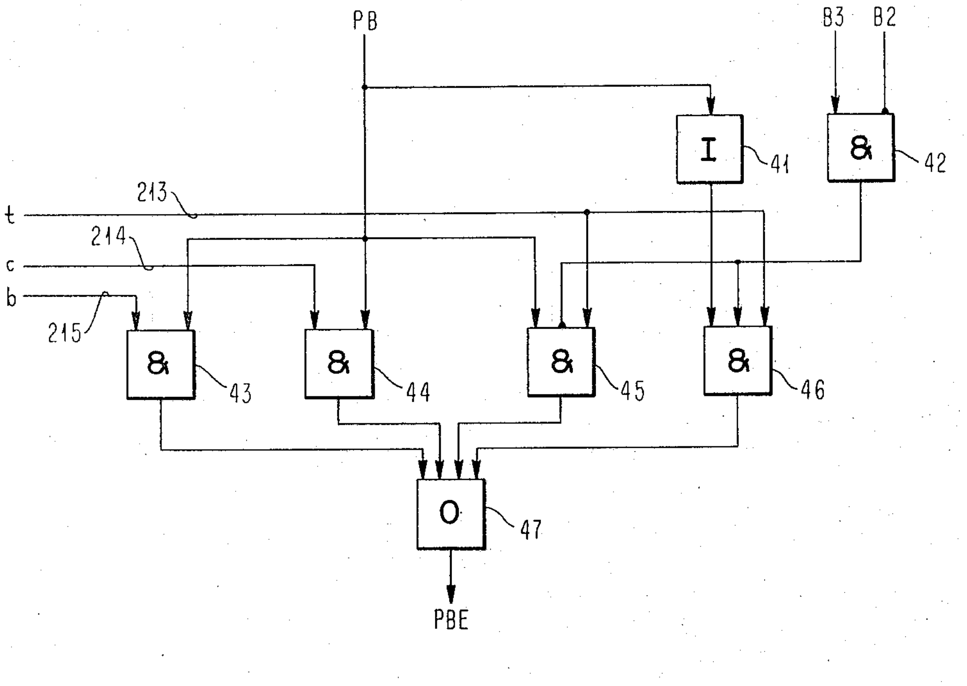
FIGURE 4A is a logic diagram of a parity modifier usable in the invention.
Figure 4C:
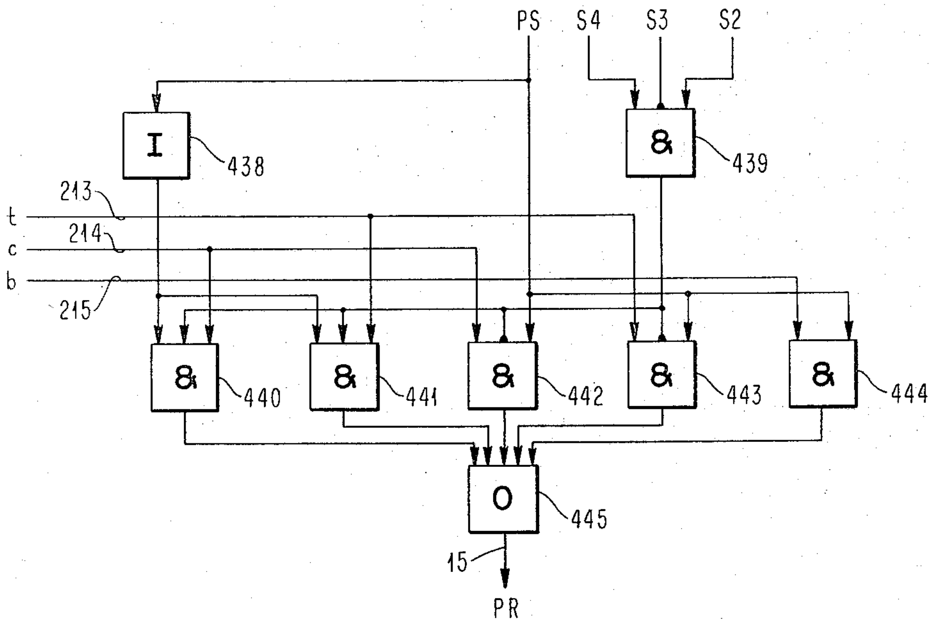
FIGURE 4C is a logic diagram of a parity corrector usable in the invention.

Referring to FIGURE 4C, a parity corrector 25 is illustrated. The parity corrector 25 modifies the parity bit PS (corresponding to the binary sum S4S3S2S1), in accordance with whatever operations are performed in the decimal corrector 22, to provide a correct parity bit PR for use with the binary-coded decimal results R4R3R2R1. Modification is performed by sensing three of the binary sum outputs S4, S3 and S2 as a function of the type of operation indicated by control lines 213, 214 and 215. For example, during binary operations (with a signal on line 215), the decimal corrector 22 does not change the binary sum S4S3S2S1 and therefore the decimal parity bit PR is the same as parity bit PS.

Assuming that binary-coded decimal addition has been performed, AND circuits 441 and 443 are activated by a signal on true *t* line 213 to sense the parity bit PS both directly and indirectly through an Invert circuit 438 and to sense the sum bits S4, S3 and S2 through an AND circuit 439. The outputs of AND circuits 441 and 443 are transferred through OR circuit 445 to supply parity bit PR on line 15.

In the case of binary-coded decimal subtraction, AND circuits 440 and 442 are activated by a signal on complement *c* line 214 to pass the parity bit PS and operand bits S4, S3 and S2 through OR circuit 445 to form parity bit PR on line 15.

If a signal on *b* line 215 indicates a binary operation, AND circuit 444 passes parity bit PS through the OR circuit 435 to the line 15 to generate a parity bit PR identical to the original parity bit PS.

III. DETAILED OPERATION

The operation of the invention will be described with reference to the figures for two operands A4A3A2A1PA (01011) and B4B3B2B1PB (01000), as generally described in Section I, for coded decimal addition the result R4R3R2R1PR (10011) is obtained, while for binary-coded decimal subtraction giving the difference R4R3R2R1PR (00010) results. In each case the decimal adder 11 operations will be described before the decimal testing circuit 12 operations through, in fact, the two operate simultaneously.

*Decimal addition (t=1-bit)*

Referring to FIGURE 2A, a 1-bit is applied to *t* line 213 indicating that binary-coded decimal addition is to be performed. Addend register 26 contains the values 01011 (decimal five) and augend register 27 contains the values 01000 (decimal four).

Referring to the decimal modifier 21 of FIGURE 3A, input lines B4, B3, B2 and B1 are 0, 1, 0 and 0 respectively. Since there is a 1-bit on line 213 AND circuits 36, 37, 38, 39 and 310 are activated to have outputs 1, 0, 0, 1 and 0 respectively. As a result, OR circuits 315, 316, 317 and 318 supply a modified operand BE4BE3BE2BE1 having the value 1010 (four plus six equals ten).

Binary adder 20 receives operand A4A3A2A1 having the value 0101 on cable 210 and modified operand BE4BE3BE2BE1 having the value 1010 on cable 211. The binary adder 20 forms, as a result, a binary sum S4S3S2S1 having the value 1111 (fifteen). No output carry $C_{out}$ occurs on line 212.

Figure 3B:
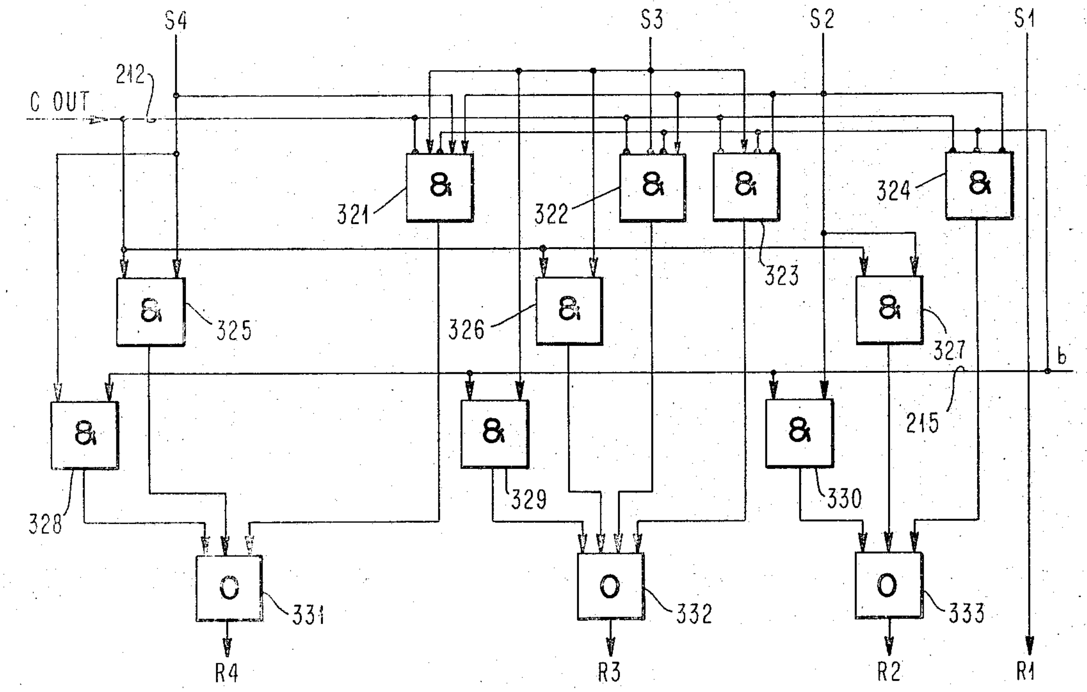
FIGURE 3B is a logic diagram illustrating one possible embodiment of a decimal corrector used in the invention.

The decimal corrector 22, shown in FIGURE 3B, receives the binary sum S4S3S2S1 having the value 1111. Since the output carry $C_{out}$ is a 0-bit, line 212 activates AND circuits 321, 322, 323 and 324 to pass signals 1, 0, 0 and 0 respectively, to the OR circuits 331, 332 and 333. Input S1 sends a 1-bit directly to R1. As a result the decimal corrector 22 supplies a binary coded decimal result R4R3R2R1 having the value 1001 (fifteen less six equals nine) to the result register 29.

The decimal testing circuits 12 of FIGURE 2B have been simultaneously operating.

The parity modifier 23, shown in detail in FIGURE 4A, monitors operand B positions PB, B3 and B2 having the values 0, 1 and 0 respectively. Since there is a signal on line 213, AND circuits 45 and 46 pass a 0-bit and a 1-bit respectively to the OR circuit 47 to supply a 1-bit on line PBE.

Binary parity predictor/checker 24 receives the original operand A4A3A2A1PA having the value 01011, and the modified operand BE4BE3BE2BE1 and modified parity bit PBE together having the value 10101. Referring to FIGURE 4B, in the binary parity checker 419, exclusive OR circuits 410, 411, 412 and 413 supply bits 1, 1, 1 and 1 respectively. Exclusive OR circuits 414 and 415, as a result, supply a 0-bit signal on line $\overline{PBEp}$ and a 0-bit signal on line $\overline{PAp}$. Exclusive OR circuits 416 and 417 compare these inverted predicted parity values with the actual parity bits (*PBE*=1 and *PA*=1) causing AND circuit 418 to pass a 1-bit to line 17 indicating that there is no error $(\overline{\text{error}})$. The binary parity predictor 420 receives over cable 49 the operands A4A3A2A1 having the value 0101 and BE4BE3BE2BE1 having the value 1010 and receive a 0-bit on *c* line 214. Circuits 421, 422, 423, 424, 425, 426 and 427 have output values 1, 1, 0, 1, 0, 1 and 0 respectively. As a result, circuits 428, 429, 430, 431, 432, 433, 434 and 447 assume the following outputs: 1, 1, 0, 0, 1, 0, 0 and 1. The Exclusive OR circuits 435, 436 and 437 pass a 0-bit through invert circuit 438 to supply a 1-bit value for the parity bit PS.

Parity corrector 25 monitors the parity bit PS (1-bit) and operand and binary sum bits S4, S3 and S2 which have the values 1, 1 and 1 respectively. Referring to FIGURE 4C, a signal on line 213 activates AND circuits 441 and 443 which emit a 0-bit and a 1-bit respectively. As a result a parity bit PR with a 1-bit value is sent to the result register 29. Result register 29 thus contains a binary coded decimal result R4R3R2R1PR having the value 10011 (nine).

*Decimal substraction (c=1-bit)*

In the case of binary-coded decimal substraction a 1-bit is supplied on the complement (*c*) line 214 in FIGURES 2A and 2B. Subtraction combines operand A4A3A2A1PA having the value 01011 (five) and B4B3B2B1PB having the value 01000 (four) to form the binary-coded decimal. Result R4R3R2R1PR having the value 00010 (one).

Referring to the decimal modifier 21 in FIGURE 3A, the input 0100 is applied, due to the signal on *c* line 214, to AND circuits 311, 312, 313 and 314 which emit an inverted value 1011 through the OR circuits 315, 316, 317, 318 to provide a modified operand BE4BE3BE2BE1 having the value 1011.

The binary adder 20 adds the operand A4A3A2A1 having the value 0101, the modified operand BE4BE3-BE2BE1 having value 1011 and a 1-bit input carry $C_{in}$ frcm *t* line 214 to form a binary sum S4S3S2S1 having the value 0001 and having a 1-bit output carry $C_{out}$ on line 212.

The decimal corrector 22, shown in FIGURE 3B passes the binary sum S4S3S2S1 having the value 0001 through AND circuits 325, 326 and 327 and over a line from input S1, to outputs R4, R3, R2 and R1 without change. As a result the output binary-coded decimal result R4R3R2R1 having a value 0001 is entered into the result register 29.

The decimal testing circuits 12, shown in FIGURE 2B has been simultaneously operating and thus supplies parity bit PR to the result register 20 at the same time.

The parity modifier 23 of FIGURE 4A passes the parity bit PB having the value 0 through AND circuit 44 and OR circuit 47 to supply a modified parity bit PBE having a value 0 equal to the original parity bit PB.

The binary parity predictor/checker 24 of FIGURE 4B receives the modified parity bit PBE, the modified operand BE4BE3BE2BE1, the parity bit PA and the operand A4A3A2A1. In FIGURE 4B, the binary parity checker 419 inputs assume the following values from left to right: 1001100111. As a result an inverse predicted parity $\overline{PBEp}$ having a value of 1 and $\overline{PAp}$ having a value of 0 are supplied to the Exclusive OR circuits 416 and 417. Since PBE is a 0-bit and PA is a 1-bit both Exclusive OR circuits 416 and 417 supply a 1-bit to the AND circuit 418 indicating on line 17 that there is no error $(\overline{\text{error}})$. The binary parity predictor 420 circuits 421 through 427 receive signals from cable 49 in the following order from left to right: 01101001011111. As a result, circuits 428 through 434 and 447 receive the following signals in order from left to right: 1111110111111001. The Exclusive OR circuits 435, 436 and 437 pass a 1-bit through the invert circuit 448 to supply a parity bit PS having a 0-bit value.

Parity corrector 25, FIGURE 4C, receives the parity bit PS having the value 0 and signals on lines S4, S3 and S2, having values 0, 0 and 0 respectively. Since there is a signal on *c* line 214, AND circuits 440 and 442 will both have 0-bit outputs. Therefore, OR circuits 445 passes a 0-bit causing line 15 to carry a 0-bit to the parity bit PR position of the result register 29.

Result register 29 therefore contains the binary-coded decimal result R4R3R2R1PR having the value 00010 (one).

There has been described an improved arithmetic testing apparatus wherein binary addition and binary parity testing circuits operate upon binary-coded decimal numbers. A binary adder forms a binary-coded decimal result from two binary-coded decimal numbers utilizing filler-digit techniques. A binary parity predictor/checker checks the binary-coded decimal input characters and predicts a parity bit for the binary-coded decimal output results in conjunction with novel modification and correction circuits.

The illustrated excess-six code need not be used, it being obvious to use the excess-three code for example, or to use biquinary-coded or two-out-of-five characters in place of binary-coded characters. Further, though odd parity was illustrated, even parity could also be used. It is not necessary that characters be entered in parallel, serial circuits being equally applicable.

While the invention has been particularly shown and described with reference to a preferred embodiment thereof, it will be understood by those skilled in the art that the foregoing and other changes in form and details may be made therein without departing from the spirit and scope of the invention.

We claim:

1. In combination:

a first source of binary-coded decimal plural-bit numeric operands each associated with a corresponding parity bit;

a second source of binary-coded decimal plural-bit numeric operands each associated with a corresponding parity bit;

a decimal modifier connected to said first source, operable to modify the numeric operands from said first source;

a binary adder, having a first input connected to said decimal modifier, a second input connected to the second source, a carry input, a plural-bit binary sum output and a carry output, operable to form binary sums and high-order carry outputs as a function of numeric bits at its inputs;

a decimal corrector, connected to said binary adder binary sum output and carry output, for adjusting the binary sum outputs as a function of the carry output, to form binary-coded decimal results which are functions of the binary-coded decimal numeric operands from said first and second sources;

a parity modifier, connected to said first source for generating as modified parity bits corresponding to the modified numeric operands from said decimal modifier as functions of the parity bits and predetermined numeric bits from said first source;

a binary parity checker and parity predictor, connected to said second source, to said decimal modifier, and to the parity modifier, for generating error indications, and for generating parity bits corresponding to binary sums from said binary adder, as functions of the operands and parity bits from said second source and the modified operands and modified parity bits;

a parity corrector, connected to the binary parity predictor and to the binary adder, for generating corrected decimal parity bits corresponding to the binary-coded decimal results from the decimal corrector; and output means, connected to said decimal corrector, and to said parity corrector for recording the decimal results and the corrected decimal parity bits.

2. Claim 1 wherein a selected one of addition and subtraction may be performed, said decimal modifier further comprising:

means operable when addition is selected to modify the numeric operands from said first source by adding six to the numeric bits; and means operable when subtraction is selected to modify the numeric operands from said first source by inverting each numeric bit.

3. Claim 2 wherein said parity modifier further comprises:

circuits operable when addition is selected to generate modified parity bits as functions of the parity bits of two predetermined numeric bits from said first source; and circuit means operable when subtraction is selected to generate modified parity bits from the first source parity bits alone.

4. An arithmetic apparatus for performing decimal arithmetic with binary circuits including:

a first source of operands, each operand including numeric bits and a corresponding parity bit;

a second source of operands, each operand including numeric bits and a corresponding parity bit;

modification apparatus, connected to said second source, for modifying the numeric bits of operands supplied by the second source;

a binary adder having a first input, connected to said first source, a second input, connected to said modification means, and having an output for supplying the binary sums of the numeric bits from said first source and the modified numeric bits from said second source;

correction means, connected to said binary adder output, for forming, from said binary sums, decimal sums of numeric bits from said first and second sources;

a parity modifier, connected to selected numeric bits and to the parity bit of said second source, for supplying modified parity bits corresponding to modified numeric bits from said modification apparatus;

binary checking means, connected to said first source, to said modification apparatus and to said parity modifier, operable as a function of the numeric bits and parity bits from said first source and the modified numeric bits and modified parity bits to signal parity errors;

binary parity prediction means, connected to the first source, to the modification apparatus and to the parity modifier, for generating binary parity bits corresponding to the binary sums from said binary adder as a function of the numeric bits and parity bits from said first source and the modified numeric bits and modified parity bits; and parity correction means, connected to said binary adder output and to said binary parity prediction means, for supplying decimal parity bits corresponding to decimal sums formed by said correction means.

5. Arithmetic testing apparatus comprising in combination:

a number of sources of operands, each operand having plural numeric bits and a corresponding parity bit;

modification means, connected to a first of said sources, for modifying numeric bits of operands supplied by said first source;

binary adder means having plural bit binary sum outputs and having a number of inputs, one input being connected to said modification means and each of the balance of said inputs being connected to different ones of said sources;

correction means, connected to said binary adder binary sum output, for forming plural bit outputs equal to the decimal sums of the numeric bits supplied by said operand sources;

input parity checking circuits, connected to two numeric bits and the parity bit of said first source, for adjusting the parity bit from said first source to compensate for the modification of numeric bits by said modification means;

binary parity checking means, connected to input parity checking circuits, to said modification means and to selected ones of said sources for indicating errors when parity bits do not correspond to their corresponding numeric bits;

binary parity prediction means, connected to input parity checking circuits, to said modification means and to selected ones of said sources, for providing binary sum parity bits corresponding to the binary adder binary sum outputs; and output parity correction circuits, connected to said binary parity prediction means and to three bits of the binary sums from said binary adder sum outputs, for adjusting the binary sum parity bits to correspond to the plural bit decimal sums formed by said correction means.

6. In combination:

a first source of decimal representative numeric bits and corresponding parity bits;

a second source of modified decimal representative numeric bits;

a third source of modified parity bits corresponding to said modified decimal representative numeric bits;

binary arithmetic apparatus, connected to said first source and second source for forming numeric bits of binary sums of the numeric bits from said first source and the modified numeric bits from said second source;

numeric correction circuits, connected to said binary arithmetic means for correcting said binary sums to represent the numeric bits of decimal sums of the unmodified decimal representative numeric bits;

parity prediction apparatus, connected to said first, second and third sources, for predicting binary parity bits corresponding to the numeric bits of said binary sums;

parity correction circuits, connected to said parity prediction apparatus and to said binary arithmetic apparatus, for adjusting said binary parity bits to correspond to the numeric bits of the decimal sums; and utilization means, connected to said numeric correction circuits and to said parity correction circuits, for storing the decimal sum numeric bits and the corresponding decimal parity bits.

7. In combination:

a first source of binary-coded decimal numeric bits and a related parity bit;

a second source of binary-coded decimal numeric bits and a related parity bit;

modifying means, connected to said second source numeric bits, for modifying said numeric bits;

arithmetic means, including a binary adder, connected to said first source and to said modifying means, for generating true binary results corresponding to binary arithmetic operations performed upon the numeric bits from said first source and the modified numeric bits from said modifying means; and parity circuits connected to said first and second sources, to said modifying means and to said arithmetic means, for generating parity bits corresponding to the binary-coded decimal equivalent of the results generated by said arithmetic means.

8. In arithmetic circuitry;

sources of binary coded decimal numeric operands each operand associated with a corresponding parity bit;

modifying means connected to one of said sources for modifying numeric operands from said source;

binary arithmetic circuits having inputs, connected to selected ones of said sources and to said modifying means, and having a binary sum output; and parity bit modification and generation means connected to said selected ones of said sources and said modifying means for generating and checking parity bits corresponding to the binary sums from said binary arithmetic circuits output.

9. Arithmetic checking circuits:

first and second sources of decimal digits, each digit being associated with a corresponding parity bit;

decimal output means;

a binary arithmetic circuit having two inputs and an output;

connection means, connecting the first source to one input of said binary arithmetic means;

adjustment circuits, connecting the second source to the other input of said binary arithmetic circuit and the output of said binary arithmetic circuit to the decimal output means, operable to enter into said output means decimal sums of the decimal digits from said sources;

binary parity prediction circuits; and parity adjustment circuits connecting said parity prediction circuits to said source, to said binary arithmetic circuit and to said decimal output means, operable to enter into said output means parity bits corresponding to the entered decimal sums.

10. In combination:

a first source of decimal operands associated with parity bits;

a second source of decimal operands associated with parity bits;

result means for holding decimal results and associated parity bits;

a binary adder;

circuits, connecting said binary adder to said sources and to said result means, utilizing said binary adder to form in the result means the decimal sums of said decimal operands;

a binary parity tester;

parity adjusting circuits, connecting said binary parity tester to said sources, to said binary adder and to said result means, utilizing said binary parity tester to form in the result means parity bits corresponding to the decimal sums.

11. Circuits for permitting a binary parity predictor to be utilized with parity bits associated with decimal operands, comprising:

sources of decimal operands and corresponding parity bits;

decimal arithmetic circuits, connected to said sources, for forming decimal results from said decimal operands;

a parity modifier, connected to said sources and to the binary parity predictor, for supplying to the binary parity predictor modified parity bits; and a parity corrector, connected to the binary parity predictor and to the decimal arithmetic circuits, for generating corrected decimal parity bits corresponding to said decimal results.

12. Circuits compensating for decimal correction of a binary result comprising:

a binary result source;

a parity source of binary parity bits corresponding to said binary results;

means connected to said binary result source for correcting said binary results to form decimal results; and logic circuits, connected to said binary result and parity sources for correcting the binary parity to form decimal parity bits corresponding to the decimal results.

13. Circuits according to claim 12 distinguished in that said logic circuits function independently of said binary result correcting means and thereby are capable of being operated to generate said decimal parity bits simultaneously with said corresponding decimal results.

14. Circuits according to claim 12 including:

binary parity checking means operable to check the said binary results against the corresponding binary parity bits, and to indicate error upon disagreement, prior to generation of the corresponding decimal parity bits by said logic circuits.

15. In a system for verifying results of arithmetic operations performed on four bit binary operands having either true binary or binary coded decimal digital significance, the combination of:

means for receiving and selectively modifying or not modifying binary operands depending respectively on whether the operand bits have binary coded decimal or true binary significance;

means for receiving only a subset of the bits of each operand presented to said selectively modifying means and for producing a binary output representing a predetermined logic function of the said subset of bits; and means responsive to the binary output of said subset receiving means and a parity bit accompanying each said operand to produce a binary output representing the predicted parity of the output operand delivered by said selectively modifying means.

16. In a system for verifying the results of arithmetic operations performed on four bit binary operands having either true binary or binary coded decimal digital significance the combination of:

first means for producing a four bit binary representation of either the sum or difference of two four bit binary operands, said representation having true binary digital significance;

second means for producing a single bit representation of the predicted parity of said sum or difference representation;

third means coupled to said first means for selectively applying a correction factor to said sum or difference representation to produce a selectively corrected sum or difference representation having either true binary or binary coded decimal digital significance;

and fourth means coupled to a subset only of the bits of said sum representation produced by said first means and to the predicted parity output of said second means for producing a representation of the predicted parity of the selectively corrected sum or difference representation produced by the third means.

References Cited by the Examiner

UNITED STATES PATENTS

| | | | |
|---|---|---|---|
| 2,970,764 | 2/1961 | Deerhake et al. | 235—153 |
| 2,989,237 | 6/1961 | Duke | 235—169 |
| 3,046,523 | 7/1962 | Batley | 340—146.1 |
| 3,061,193 | 10/1962 | Newby et al. | 235—153 X |
| 3,063,636 | 11/1962 | Sierra | 235—153 |
| 3,083,910 | 4/1963 | Berkin | 235—153 |

MALCOLM A. MORRISON, *Primary Examiner.*

ROBERT C. BAILEY, *Examiner.*

M. P. ALLEN, M. P. HARTMAN, M. A. LERNER, *Assistant Examiners.*